Sept. 29, 1970     T. B. DALTON     3,531,141
PINTLE HOOK ASSEMBLY
Filed Nov. 20, 1968     2 Sheets-Sheet 1
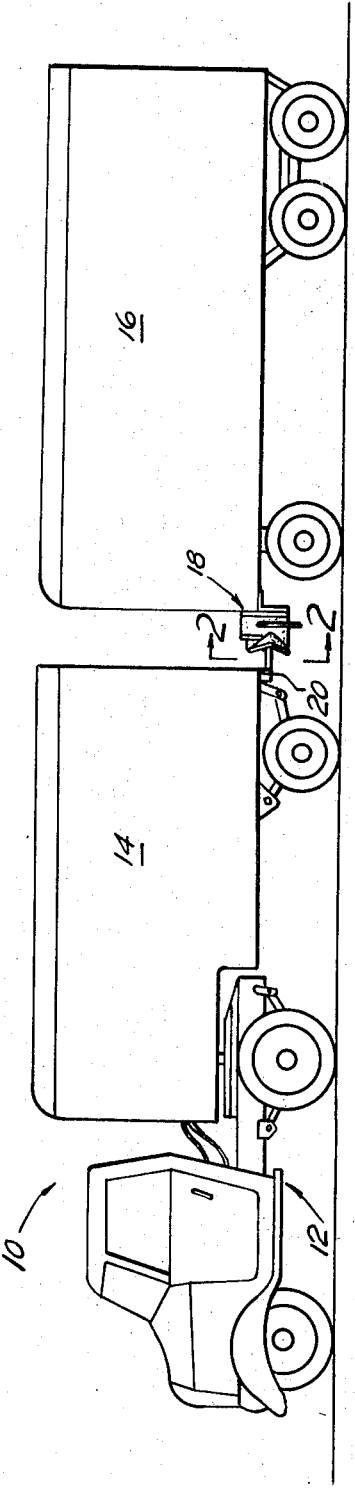
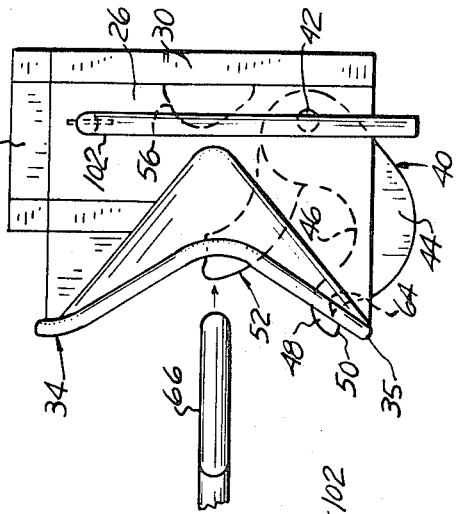
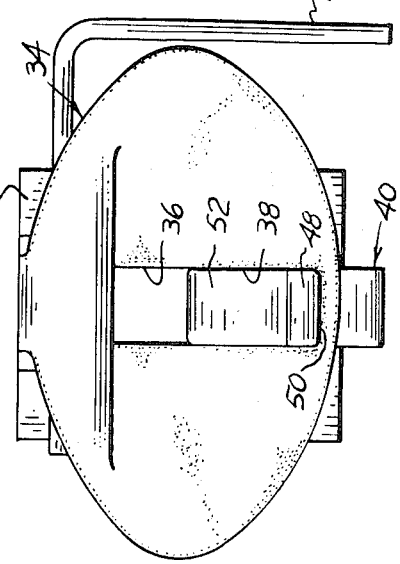
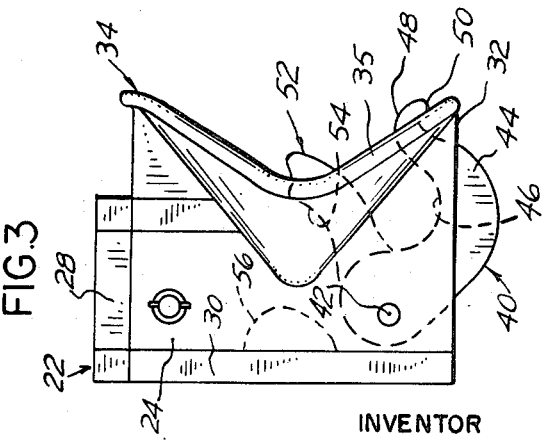
INVENTOR
THOMAS B. DALTON
BY *Hauke, Knax, Gifford, & Pataledi*
ATTORNEYS Sept. 29, 1970  T. B. DALTON  3,531,141
PINTLE HOOK ASSEMBLY
Filed Nov. 20, 1968  2 Sheets-Sheet 2
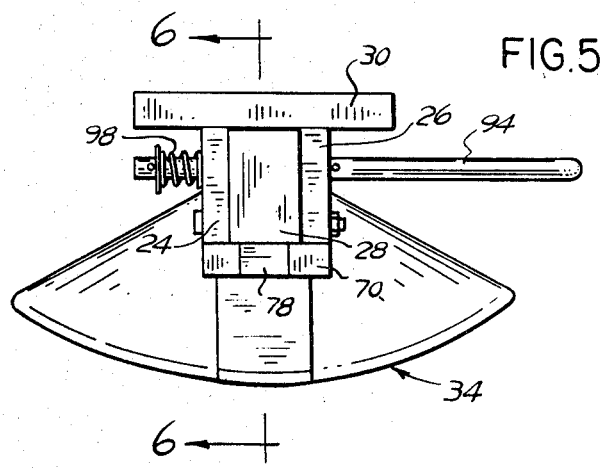
FIG.5
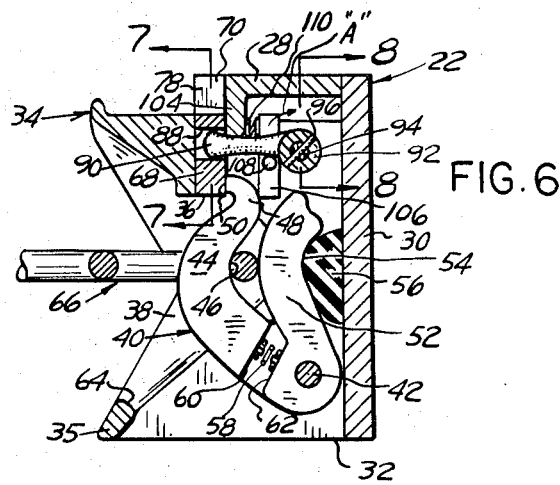
FIG.6
FIG.7
FIG.8
INVENTOR
THOMAS B. DALTON
BY Hauke, Kruss, Gifford, & Pataluk
ATTORNEYS United States Patent Office 3,531,141
Patented Sept. 29, 1970

3,531,141
PINTLE HOOK ASSEMBLY
Thomas B. Dalton, Muskegon, Mich., assignor to Westran Corporation, Muskegon, Mich., a corporation of Michigan
Filed Nov. 20, 1968, Ser. No. 777,354
Int. Cl. B60d 1/04
U.S. Cl. 280—506                              7 Claims

ABSTRACT OF THE DISCLOSURE

An automatic pintle hook assembly for a draw bar hitch connection provided with a pivotal hook for an eye of a draw bar including a snubber or tumbler resiliently connected to the hook and adapted in a locked position of the pintle hook assembly to abut against a resilient cushion which functions as a shock absorber to eliminate play between the draw bar eye and the hook to thus reduce shock loads caused by the working of the draw bar eye on the hook and including an automatic safety lock to prevent the hook from disengagement.

BACKGROUND OF THE INVENTION

Field of the invention

The present invention relates to a hitch coupling for a trailer adapted to be towed by a draft vehicle, and more particularly to an automatic locking pintle hook assembly to be mounted on the front of the trailer vehicle or, if desired, on the rear of the draft vehicle to engage and securely lock with a coupling eye of a draw bar linkage.

Description of the prior art

Pintle hook assemblies which include a pivotal hook adapted upon engagement by the coupling eye of a draw bar to be swung upwardly to engage with the coupling eye and to be then locked in position by releasable latch means or the like are known in the art. Such conventional pintle hook assemblies have a decided disadvantage in that no means, or only insufficient means, are provided to lock the coupling eye onto the hook in such fashion as to provide for the absorbing of shock loads caused by the draw bar connection during travel of the towed vehicle. Such loads are especially pronounced during deceleration and braking and then accelerating again and these shock loads are transmitted by the coupling eye during these conditions in the form of "jerks" to the hook, which ultimately may result in damage and breakage. Likewise, in automatic pintle hook couplings of this type in which the draft vehicle is backed up or the draw bar is automatically extended from the draft vehicle to engage the pintle hook, due to the force with which the draw bar engages the pintle hook, damage to the pintle hook mechanism or coupling eye may occur if not properly cushioned to absorb this force.

SUMMARY OF THE INVENTION

Accordingly, the present invention provides an improved pintle hook mechanism having cushioning means to absorb the engagement force with which the draw bar engages the pintle hook and to absorb shock loads in the form of "jerks" transmitted by the coupling eye of the draw bar during operation of the vehicle train.

The present invention further provides for locking the coupling eye to the pintle hook in a manner which virtually eliminates any undesirable play between the pintle hook and the coupling eye.

BRIEF DESCRIPTION OF THE DRAWINGS

Further novel features will become apparent from the following detailed description in connection with the appended drawings which illustrate a preferred embodiment of the present invention.

FIG. 1 is an exemplary illustration of a vehicle train including a draft vehicle and a trailer vehicle in which the present novel pintle hook mechanism may be embodied to hitch the two vehicles togther;

FIG. 2 is a front elevation of the present novel pintle hook mechanism used in the vehicle train in FIG. 1;

FIG. 3 is a left side elevational view of the pintle hook mechanism of FIG. 2;

FIG. 4 is a right side elevational view of the pintle hook mechanism of FIG. 2 showing the coupling eye of the draw bar in position immediately preceding the engagement of the eye with the hook;

FIG. 5 is a top plan view of the pintle hook mechanism of FIG. 2;

FIG. 6 is a vertical cross sectional view of the pintle hook mechanism along the line 6—6 of FIG. 5;

FIG. 7 is a cross section through the latch mechanism embodied in the pintle hook mechanism of FIG. 6 as seen along line 7—7 thereof; and FIG. 8 is a cross section through the latch release bar arrangement embodied in the pintle hook mechanism of FIG. 6 as seen along line 8—8 thereof.

DESCRIPTION OF THE PREFERRED EMBODIMENT

With particular reference to FIG. 1, the vehicle train 10, shown for illustrative purposes, includes a tractor 12, and semitrailer 14 which form the draft unit of the vehicle train. Hitched to the semitrailer 14 is a self-contained trailer 16 connected thereto by the present novel pintle hook assembly 18 and draw bar linkage 20. Although the pintle hook assembly is shown attached to the front end of the self-contained trailer 16 and the draw bar linkage 20 to the rear end of the semitrailer, it will be understood that their positions could be reversed without affecting their operation.

With reference now to the remaining figures, the pintle hook assembly 18 is comprised of a housing 22 having opposite side walls 24 and 26 conected by a closed top wall 28 and attached as by welding or otherwise to a rear wall 30 by which the pintle hook assembly is fastened to the vehicle body. The lower end 32 of the housing is open for reasons to appear and the front of the housing opposite the rear wall 30 is formed by a bell mouthed guide member 34 to guide the coupling eye into the housing as will be explained.

The bell mouthed guide member 34 has a central opening 36 (FIG. 6) for the reception of the coupling eye 66, which is intersected by a slot 38 in the lower portion 35 of the guide member 34 for movement of the pintle hook 40 therethrough.

The pintle hook 40, which is pivoted on the pin 42 between the housing side walls 24 and 26, has an upwardly bent-over hook portion 44 providing an arcuate surface 46 at the rear thereof which forms a seat for engagement with the inner surface of the coupling eye 66. The tip of the hook is reversely bent outwardly to provide an outward hook portion 48 having a flat abutment surface 50 at the end thereof for a purpose to be described.

The pintle hook 40 coacts with and is resiliently connected to a tumbler lever or snubber 52 positioned at the rear of the hook and likewise mounted to the pivot pin 42 to normally swing as a unit with the pintle hook 40. The snubber 52 is slightly bent-over rearwardly to provide a concave rear surface 54 for engagement with a resilient cushion stop 56 attached to the inside of the rear wall 30 of the housing 22 and which is preferably made of rubber or the like resilient material. The snubber 52 and pintle hook 40 are resiliently biased for limited movement towards and away from each other by means of a spring 58 positioned at the junction of the two members adjacent the pivot pin 42 and which is retained between a surface 60 on the pintle hook 40 and an opposite surface 62 on the snubber 52.

In the inactive, disengaged position of the pintle hook assembly as illustrated in FIGS. 3 and 4, the pintle hook 40 and snubber 52 are displaced outwardly of the housing 22 through the slot 38 of the guide member 34, permitting the outer hook portion 48 of the pintle hook to rest upon a complementary abutment surface 64 at the bottom of the slot 38. The associated snubber 52, in this position of the assembly, is disposed in the upper portion of the slot 38 in alignment with the central opening 36. As indicated in FIG. 4, in order to make a hitch connection, the coupling eye 66 is brought in line with the central opening 36 of the bell guide member and is then moved under force against the snubber 52 in a direction inwardly of the pintle hook housing 22. By this movement, the snubber 52 is displaced rearwardly into the housing 22 taking the pintle hook 40 with it for displacement upwardly through the slot 38 and concurrently into and through the coupling eye 66 upon further force movement of the coupling eye into the housing 22.

As seen in FIG. 6 in the final stage, the coupling eye 66 is hooked over the pintle hook 40 to engage with the arcuate seat surface 46 at the rear of the pintle hook whereas the snubber 52 is being depressed rearwardly against the cushion stop 56 to be engaged by the concave rear surface 54 of the snubber. The resilient reaction force of the cushion stop 56 tends to move the snubber forwardly against the outside of the coupling eye and thus to resiliently clamp the coupling eye between the pintle hook 40 and the snubber 52 with virtually no play between these members to eliminate backlash and reduce the shock loads caused by "jerks" on the pintle hook. The shape of the cushion stop 56 is preferably such that inward force against it will be met with increased resistance. The particular shape shown wherein the cross sectional area increases inwardly has been found to produce this result.

With particular reference to FIGS. 6–8, upon the pintle hook being moved into the housing 22 through the central opening 36 the tip of the pintle hook displaces a spring loaded latch member 68, which is slidably retained in the upper portion 70 of the housing 22 immediately adjacent and to the rear of the bell guide member 34 and between the latter and the top wall 28 of the housing. As seen in FIG. 7, the latch member 68 is preferably in the form of an inverted T-bar composed of a flange portion 72 slidable between the opposed walls 74 and 76 of the upper front housing portion 70. An aperture 78, defined by opposed walls 80 and 82 at the top of the upper front housing portion 70, is adapted to slidingly receive the central ridge portion 73 of the latch member 68. The opposed spaces, defined by the walls 74–80 and 76–82 receive expansion springs 84 and 86 respectively, which normally hold the latch member in the lowermost locked position indicated in FIG. 6 to permit the flat abutment surface 50 of the pintle hook to engage the rear of the latch member 68 after the latch member has snapped back in place by force of the springs 84–86 to lock the pintle hook in the housing 22. In order to release the latch for uncoupling the pintle hook, the central ridge portion 73 of the latch member is provided with an aperture 88 into which extends a lever 90 which extends rearwardly into the housing 22 and is secured to or integral with a hub 92 which is placed on a rod 94 and is nonrotatably secured thereto by means of a key pin or the like 96. The rod 94 extends transversely through the housing 22 to be rotatably supported in the housing side walls 24 and 26 and is retained in position thereon at one end by a spring 98 placed around the end of the rod outside of side wall 24 and adjacent to the other side wall 26 by a cotter pin 100. The far end of the rod 94 is formed into a handle 102 by which the rod and thus the release lever 90 may be rotated to raise the latch member 68 to free the pintle hook 40.

In accordance with the present invention a "fail-safe" lock mechanism is provided to prevent the pintle hook 44 from disengagement from behind the latch member 68 due to failure of the springs 84, 86 or due to vibrational forces in the assembly during operation which, under certain conditions, can cause the latch member to move upwardly and thus release the pintle hook. To prevent this from happening the following mechanism is provided: in the engaged position of the pintle hook as shown in FIG. 6 the lever 90 of the release unit abuts underneath a ledge 104 formed within the housing 22 adjacent to the latch 68. With additional reference to FIG. 8, in the locked position as shown the hub 92 of the lever is moved against the wall 24 of the housing by means of the expansion spring 98 at the end of the rod 94 which tends to urge the rod in the direction "Y" and thus moves the lever hub 92 towards the wall 24. In this position, as illustrated in FIG. 6, the lever abuts upwardly against the ledge 104 thus locking the latch 68 and preventing it from accidental movement.

To release the lock the rod 94 has to be pulled in the direction "Z" (FIG. 8) against the resistance of the spring 98 by means of the handle 102. The rod 94 is moved until the hub 92 comes into abutment against the opposite wall 26 by which the lever 90 is moved from underneath the ledge 104 by reason of the lever moving with the hub 92 within the latch aperture 88. In this position the rod 94 can be turned by upward pull on the handle 102 to rotate the lever 90 upwardly to thereby raise the latch 68 and free the pintle hook 44. As the pintle hook 44 rotates out of the housing 22 an intermediate pivot latch 106 located in the housing 22 on a pin 108 is rotated rearwardly in the direction of the arrow "A" to locate between the hub 92 and the wall 24 to thus lock the hub 92 against the wall 26 in order to keep the lever 90 away from the ledge 104 to allow the latch 68 to move upwardly upon return of the pintle hook 44 into the housing 22. The intermediate pivot latch 106 is normally held in the hub locked poistion by means of a spring 110 acting on the upper portion thereof. The pin 108 for the latch 106 provides a stop for the lever 90 to restrict further downward movement.

Upon movement of the pintle hook 44 into the housing 22 as described previously the latch 68 is forcibly moved upwardly until cleared by the tip 48 of the hook at which time the intermediate pivot latch 106 will be rotated in reverse by the section 48 of the hook to free the lever hub 92 upon which the spring 98 acts to move rod 94 and thus the hub 92 back towards wall 24. At the same time the latch 68 drops down through the force of the springs 84, 86 to lock against surface 50 of the hook and the lever 90 will then again be located underneath the ledge 104 to securely lock the latch 68 in that position. Thus the present invention provides an efficient safety lock feature in connection with the novel pintle hook assembly to guard against accidental release of the pintle hook.

With reference again to FIG. 6, the resilient bias connection between the pintle hook 40 and snubber 52 by means of the spring 58 cooperates with the resilient cushion stop 56 to retain the pintle hook against the latch member 68 regardless of the inward force exerted by the coupling eye 66 which force will be absorbed by the cushion stop 56.

In summary, the present improved pintle hook assembly provides an automatic safe locking means, in conjunction with resilient means, to absorb shock loads to prevent breakage or other damage to the pintle hook assembly.

The present invention may be embodied in other forms without departing from the spirit and the essential characteristics thereof, therefore, the present embodiment is considered in all respects illustrative and not restrictive, the scope of the invention being indicated by the appended claims rather than by the foregoing description.

What I claim is:

1. A hitch assembly for connection with a coupling eye comprising
   a pintle hook and means for pivotally supporting said pintle hook,
   snubber means pivotally and resiliently connected with said pintle hook for movement together with said pintle hook and for relative movement toward and away from said pintle hook,
   said snubber means being adapted to be engaged by said coupling eye upon engagement of said hitch assembly and said coupling eye and to be moved by said coupling eye to thereby move said pintle hook into a position to engage said coupling eye,
   means for locking said pintle hook in the engaged position, and
   a resilient member mounted in a position to be engaged by said snubber means and to be compressed upon movement of said snubber means by said coupling eye whereby upon release of said snubber means by said coupling eye said resilient member urges said snubber means outwardly to engage said coupling eye.

2. The assembly as defined in claim 1, in which said resilient member comprises a block of resilient material.

3. A hitch assembly for connection with a coupling eye comprising,
   a housing and a hook pivotally mounted in said housing for engagement with the coupling eye,
   a snubber resiliently connected with said hook and pivotal therewith,
   a resilient member carried by said housing,
   said snubber being disposed to be engaged by said coupling eye upon engagement by said hitch assembly and said coupling eye and to be moved by said coupling eye into engagement with said resilient member,
   movement of said snubber being operable to bring said hook into locking engagement with said coupling eye,
   releasable latch means for locking said hook in the engaged position,
   said resilient member being compressed against said housing by said snubber as said hook is moved to said engaged position and being operable to urge said snubber outwardly against said coupling eye upon release of the force of said coupling eye against said snubber.

4. In the assembly defined in claim 3, said releasable latch means comprising a spring loaded latch slidably disposed in said housing in the path of movement of said hook, a lever operatively connected to said latch, and means to rotate said lever to move said latch out of the path of movement of said hook.

5. In the assembly defined in claim 4, an abutment in said housing in the path of movement of said lever when said latch is in the hook engagement position to lock said latch in said position, said means to rotate said lever comprising a longitudinally slidable rod adapted to move said lever out of engagement with said abutment upon sliding movement of said rod to free said latch.

6. In the assembly defined in claim 5, and further including an intermediate pivot latch disposed in said housing adapted to cooperate with said lever and said rod to lock said rod against sliding movement in the latch released position.

7. In the assembly defined in claim 6, said pivot latch being positioned in the path of movement of said hook so that when said hook is disposed within said housing said pivot latch will be caused to release said rod and when said hook is moved outwardly with respect to said housing said pivot latch will be caused to lock said rod.

References Cited

UNITED STATES PATENTS

| 2,547,313 | 4/1951 | Gosser | 280—509 |
| 2,522,791 | 9/1969 | Ketel | 280—506 |

FOREIGN PATENTS

| 1,149,620 | 5/1963 | Germany. |

BENJAMIN HERSH, Primary Examiner

R. R. SONG, Assistant Examiner